Figure 1:
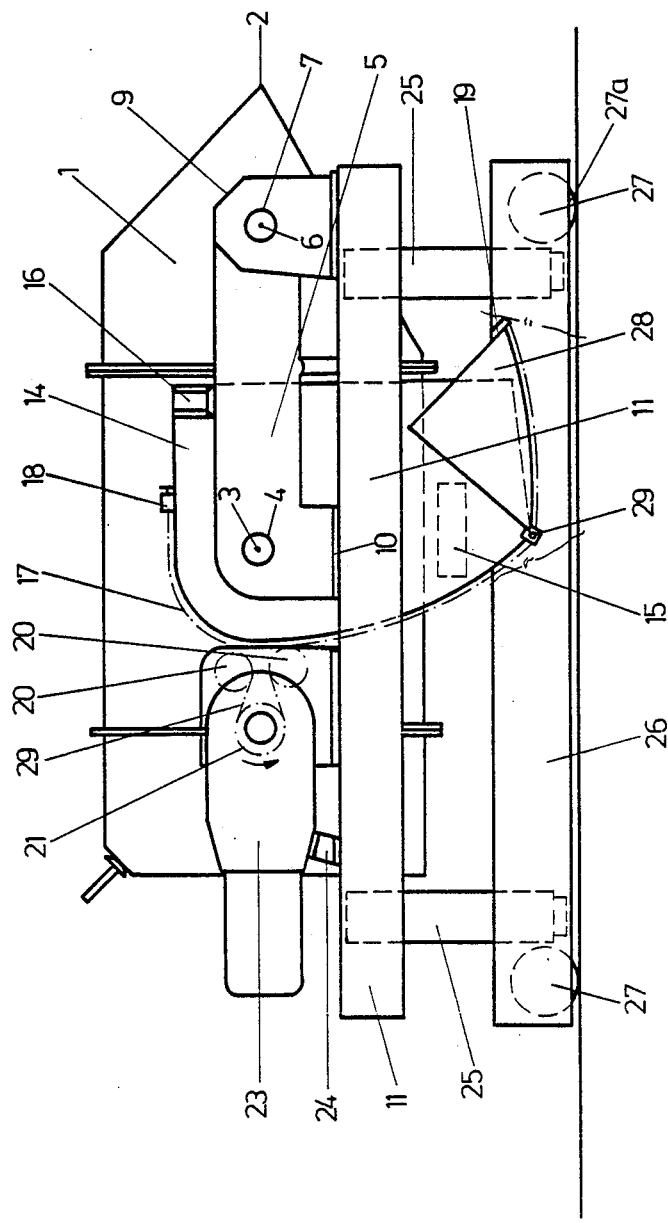

United States Patent [19]

Mutschlechner et al.

[11] Patent Number: 4,817,919
[45] Date of Patent: Apr. 4, 1989

[54] DEVICE FOR CASTING, PARTICULARLY CONVERTER FOR CASTING AND/OR POST-TREATING MOLTEN METAL

[75] Inventors: Hermann Mutschlechner, Hall i.T.; Herbert Platzer, Innsbruck, both of Austria; Rudolf Pavlovsky, Schaffhausen, Switzerland

[73] Assignee: George Fischer Limited, Schaffhausen, Switzerland

[21] Appl. No.: 589,110

[22] PCT Filed: Jun. 1, 1983

[86] PCT No.: PCT/CH83/00070
§ 371 Date: Feb. 7, 1984
§ 102(e) Date: Feb. 7, 1984

[87] PCT Pub. No.: WO83/04419
PCT Pub. Date: Dec. 22, 1983

[30] Foreign Application Priority Data

Jun. 7, 1982 [CH] Switzerland ............ 3497/82-3

[51] Int. Cl.⁴ ............................................. C21C 5/46
[52] U.S. Cl. .................................... 266/245; 266/276
[58] Field of Search ................. 266/245, 240, 276

[56] References Cited

U.S. PATENT DOCUMENTS

| | | | |
|---|---|---|---|
| 2,129,050 | 9/1938 | Dumas et al. | 266/240 |
| 2,413,231 | 12/1946 | Hoke | 266/240 |
| 2,562,441 | 7/1951 | Stroman | 266/240 |
| 3,531,074 | 9/1970 | Zelley et al. | 266/240 |
| 3,567,205 | 3/1971 | Armour et al. | 266/240 |
| 3,784,178 | 1/1974 | Wernli | 266/245 |

FOREIGN PATENT DOCUMENTS

| | | |
|---|---|---|
| 0166488 | 12/1903 | Fed. Rep. of Germany . |
| 1207554 | 12/1965 | Fed. Rep. of Germany . |
| 1815214 | 12/1969 | Fed. Rep. of Germany . |
| 2216796 | 11/1972 | Fed. Rep. of Germany . |
| 0338013 | 12/1930 | United Kingdom . |

OTHER PUBLICATIONS

*Stahl and Eisen*, 94, No. 14, 7174,"Verwendung von metallischem Magnesium bei der Herstellung von Gusseisen mit Kugelgraphit", p. 647.

*Primary Examiner*—S. Kastler
*Attorney, Agent, or Firm*—Toren, McGeady & Associates

[57] ABSTRACT

A casting device in particular a converter for pouring and/or treating of molten metal is provided with a tilting mechanism. A tilting arm with two turn- or tilting axles at least is provided for. A guiding segment allied to the tilting arm show—according to the relation to the tilting axle—different arc radii. The segment is motor-driven and spanned by one chain at least.

6 Claims, 5 Drawing Sheets

DEVICE FOR CASTING, PARTICULARLY CONVERTER FOR CASTING AND/OR POST-TREATING MOLTEN METAL

The present invention refers to a casting device in particular to a converter for pouring and/or treating of molten metal.

Such equipment permit one to tilt the converter into different positions required in the course of a treatment cycle.

Such equipment is used for processes to introduce volatile additives in particular magnesium into an iron-carbon melt, the vaporization thereby being initiated by tilting of converter vessel.

Known is a tilting device for induction furnaces with three tilting axles. The tilting axles are formed by stub pivots which are alternately put into tilt bearings provided for that purpose.

A variety of known tilting devices are hydraulically operated.

These known devices are expensive and complicated in design. Changing from one tilting movement to another moreover, is time consuming and troublesome.

The invention shall propose a device which enables tilting of a vessel or converter into various positions in a mechanically simple way which is economic and makes maintenance easy.

Figure 2:
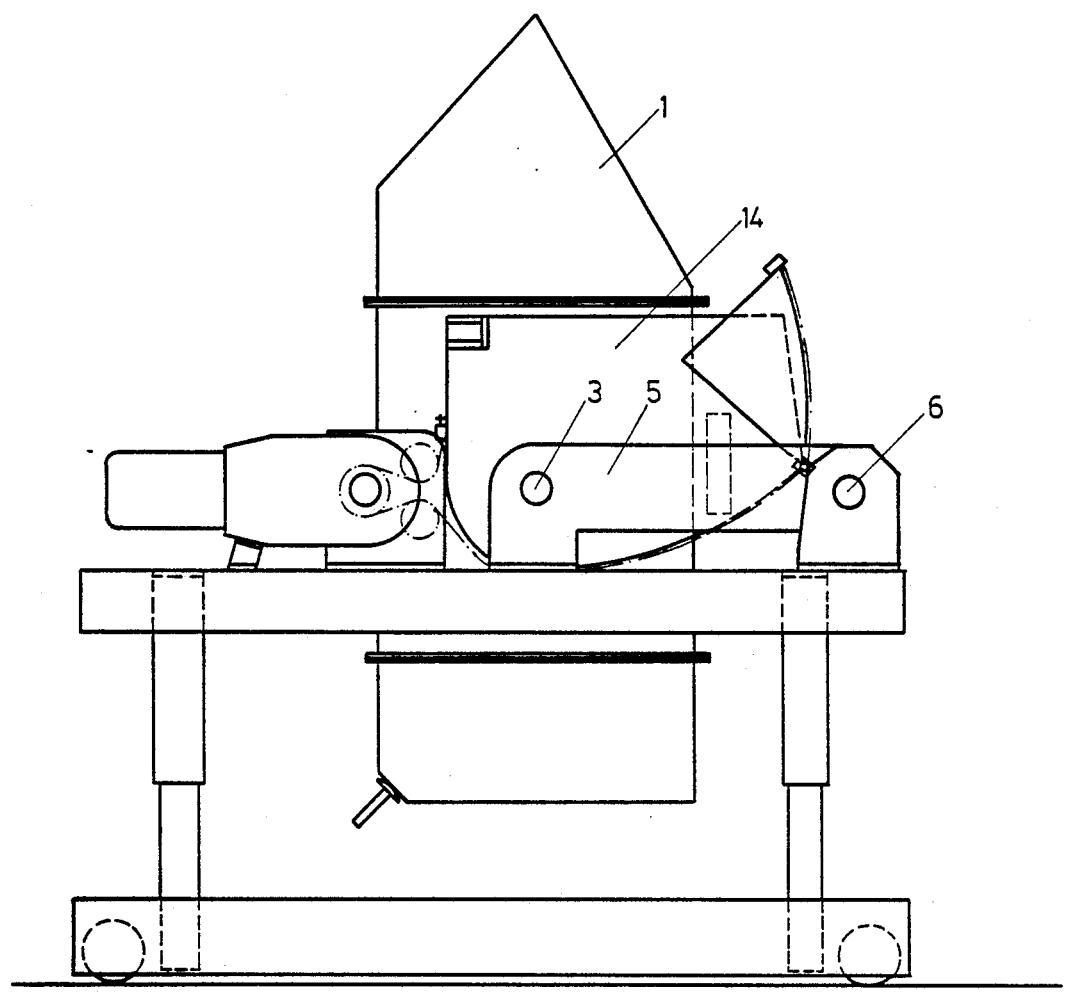
Figure 3:
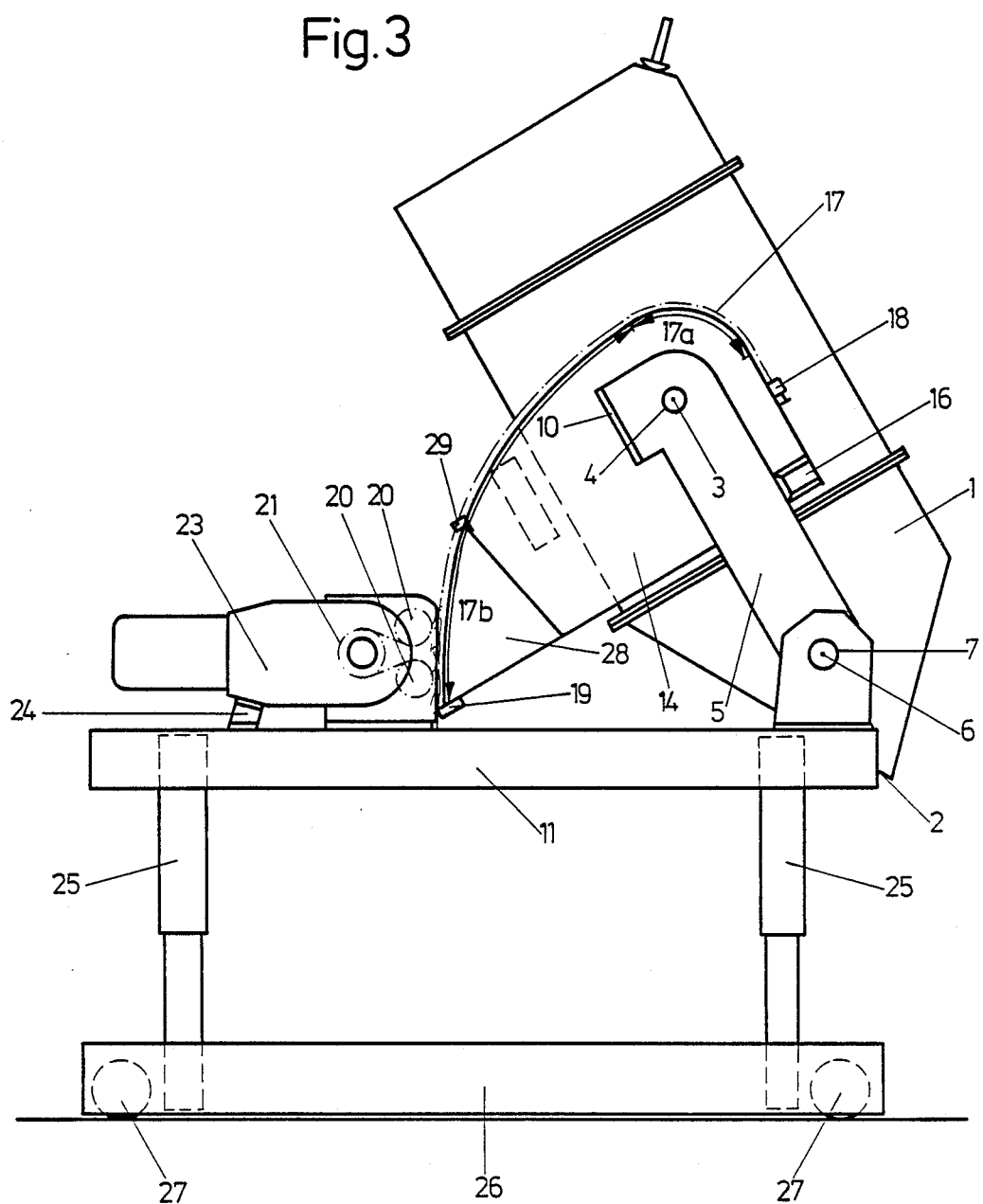
Figure 4:
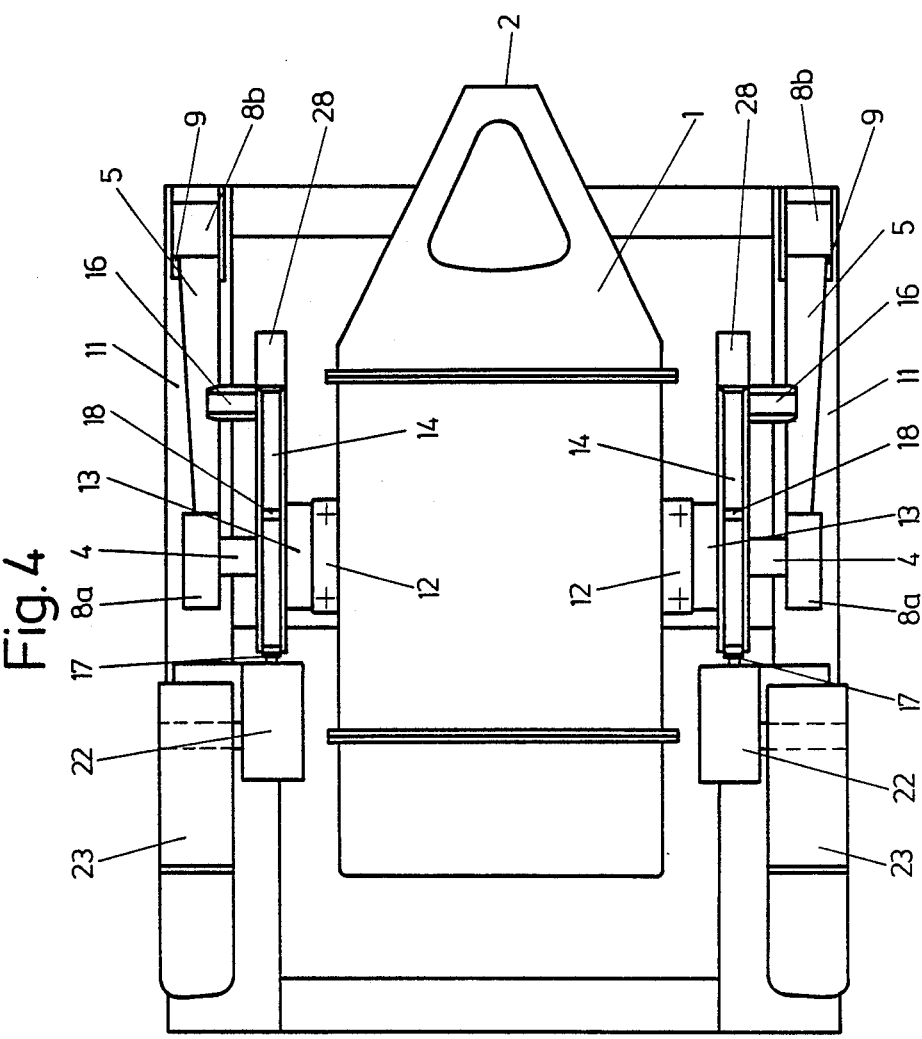

One example of the invention is shown on the drawings and shall be further explained by means of the figures which show:

FIG. 1 A side view with the converter in charging position,

FIG. 2 A side view with the converter in treating position,

FIG. 3 A side view with the converter in discharging position,

FIG. 4 A top view of the equipment, and

Figure 5:
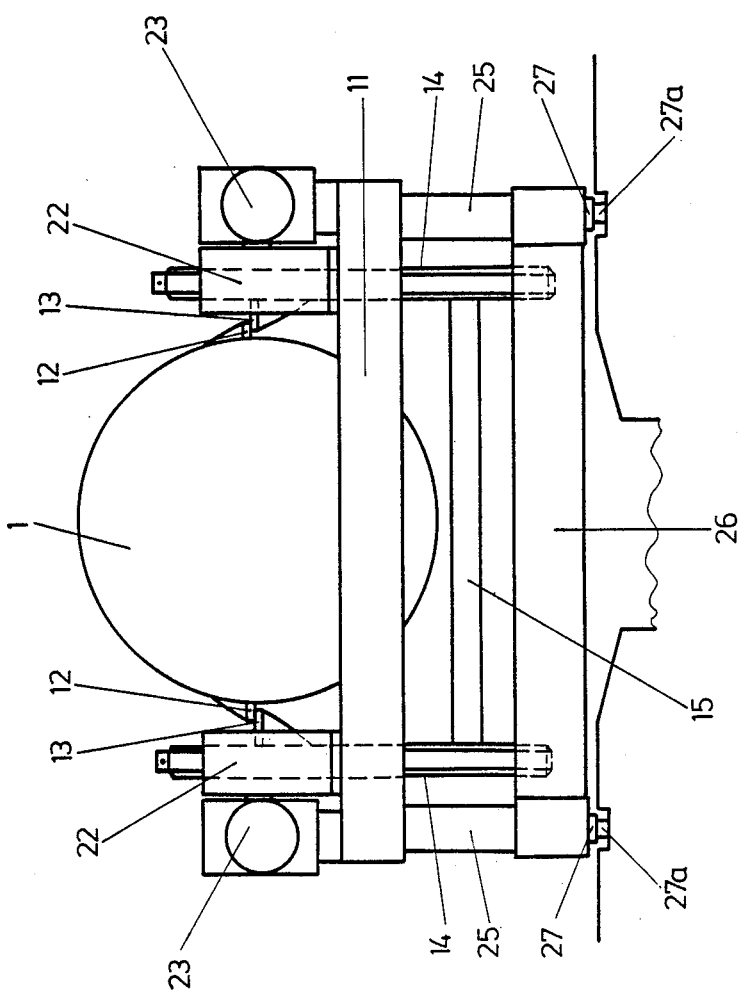

FIG. 5 A rear view of the equipment.

FIG. 1 shows a converter 1 in a charging position and which on both sides is fixed via supports 12 (FIG. 5) to the brackets 13 of the guiding segments 14 e.g. by means of screws.

Driving ensues on both sides by drive units 22 and motors 23 which are fixed to a vertically displaceable frame 11, the vertical movement being actuated by mechanisms 25. The device is equipped with wheels 27 for horizontal movement on rails 27a.

A tilting mechanism is provided with at least one tilting arm 5 which—by means of bearing block 8b and bolt 7—forms a stationary tilting axle 6 close to the converter spout 2, (FIG. 4). Tilting arm 5 further includes an additional tilting axle 3 which is spaced from the stationary axle 6. Segment 14 is carried on the bearing block 8a of tilting arm 5 by means of a bolt 4 and is supported via segment bracket 16 on tilting arm 5. Chain 17 is guided along segment 14 and around return pulleys 20 and driver wheel 21. Segment 14 becomes actuated by means of motors 23 and drive blocks 22 which are fixed to the vertically movable frame 11.

Chain 17 is clamped between points 18 and 19. Segment 14 has two different radii, which are determined by the respective tilting axles 3 and 6 to the segment arcs or bows 17a and 17b. This enables one to tilt the converter ladle 1 around its centre of gravity about axle 3 with the small radium according to segment bow 17a (FIG. 2) as well as around its spout (FIG. 3) around axle 6 with the large radius according to segment bow 17b.

Both segments 14 are fixed together by one or several spacers 15.

Converter 1 with its bearings and both its driving units is attached to the U-shaped frame 11.

A treatment cycle runs as follows:

After charging of converter ladle 1 it is tilted into the upright treating position. By selecting the sense of rotation of motors 23 anti-clock wise (FIG. 1) the treating position according to FIG. 2 is reached, the converter thereby tilts around axle 3. After termination of treatment the converter is tilted back into the horizontal position. For this purpose the sense of rotation of motors 23 is switched to clock-wise operation. As soon as the segment brackets 16 touch tilting arm 5—provided that the motor drive is not interrupted—the base plate 10 of tilting arm 5 lifts off from frame 11 starting tilting of the ladle 1 around the axle 6 so as to discharge the treated metal.

Segment 14 can be buckled at point 29 enabling the lowering of converter spout 2 to make direct charging from a furnace possible. This results in lower heat losses due to avoiding the use of the usual transfer ladles.

Segment 14 can be provided with toothing instead of using a chain. Driver wheel 21 in this case would gear directly to the teeth.

We claim:

1. A casting device comprising a converter vessel, at least one chain guide segment fixed to said converter vessel, means for driving said guide segment, said guide segment having a first segment arc and a second segment arc serially arranged thereon, each of said first and second segment arcs having a different radius, wherein the improvement comprises only one tilting arm connected to each said guide segment, said tilting arm being elongated, a first bearing block and a second bearing block positioned on and disposed in spaced relation in the elongated direction of said tilting arm, said first segment arc having a smaller radius than said second segment arc, a stationary axle mounted in said second bearing block, said stationary axle forming the pivot point of the radius of said second segment arc, a tilting axle mounted in said first bearing block and said tilting axle forming the pivot point of said first segment arc, and said means for driving said guide segment includes only one driving member connected to each said guide segment, said converter vessel and said at least one guide segment being pivotally displaceable relative to said tilting arm about said tilting axle, and said converter vessel guide segment and tilting arm being pivotally displaceable about said stationary axle.

2. A casting device, as set forth in claim 1, wherein said means for driving said guide segment comprises a chain clamped onto said guiding segment and said chain spans said first and second segment arcs.

3. A casting device, as set forth in claim 2, wherein said means for driving includes a driving wheel, and said chain forms a loop extending around said driving wheel.

4. A casting device, as set forth in claim 1, wherein one said guide segment and one said tilting arm is located on each of the diametrically opposite sides of said converter vessel.

5. A casting device, as set forth in claim 2, 3 or 4, wherein a vertically displaceable frame supports said at least one guide segment, said tilting arm connected to said at least one guide segment and said converter vessel.

6. A casting device, including a tiltable converter vessel, and means for tiltably supporting said converter vessel, wherein the improvement comprises only one elongated tilting arm located on each of a pair of diametrically opposite sides of said converter vessel, a guiding segment supported on each said tilting arm, stationary first tilting axle means located on each of said tilting arms, pivotably displaceable second tilting axle means located on each of said tilting arms and spaced in the elongated direction of said tilting arm from said first tilting axle means, each said guide segment having a corresponding first segment arc and second segment arc and each of said first and second segment arcs having a different radius of curvature with the radius of curvature of said first segment arc being the distance from said first tilting axle means to said first segment arc and the radius of curvature of said second segment arc being the distance from said second tilting axle means to said second segment arc and said first segment arc being greater than said second segment arc, and said first and second segment arcs being serially arranged on said guiding segment and one end of said first segment arc being contiguous to one end of said second segment arc, said converter vessel and said guide segments being pivotally displaceable relative to said tilting arm about said second tilting axle means, and said converter vessel guide segment and tilting arm being pivotally displaceable about said first tilting axle means.

* * * * *